United States Patent
Beam

(10) Patent No.: US 10,913,422 B2
(45) Date of Patent: Feb. 9, 2021

(54) AIRBAG DOOR FOR A VEHICLE INTERIOR PANEL AND METHOD OF MANUFACTURING THE SAME

(71) Applicant: Faurecia Interior Systems, Inc., Auburn Hills, MI (US)

(72) Inventor: Scott Beam, Commerce Township, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 52 days.

(21) Appl. No.: 16/260,873

(22) Filed: Jan. 29, 2019

(65) Prior Publication Data

US 2020/0238939 A1 Jul. 30, 2020

(51) Int. Cl.
*B60R 21/2165* (2011.01)
*B60R 21/216* (2011.01)
*B29C 37/00* (2006.01)
*B29L 31/30* (2006.01)

(52) U.S. Cl.
CPC ...... *B60R 21/2165* (2013.01); *B29C 37/0057* (2013.01); *B60R 21/216* (2013.01); *B29L 2031/3008* (2013.01); *B29L 2031/3038* (2013.01)

(58) Field of Classification Search
CPC .............. B60R 21/2165; B60R 21/216; B29C 37/0057; B29L 2031/3008; B29L 2031/3038
USPC .......................................... 280/728.2, 728.3
See application file for complete search history.

(56) References Cited

U.S. PATENT DOCUMENTS

| | | | | |
|---|---|---|---|---|
| 5,060,971 A | * | 10/1991 | Nanbu | B60R 21/21656 280/728.3 |
| 5,080,393 A | * | 1/1992 | Dixon, Jr. | B60R 21/2165 280/728.3 |
| 5,082,310 A | * | 1/1992 | Bauer | B26D 3/085 280/728.3 |
| 5,172,931 A | * | 12/1992 | Baba | B60R 21/21656 280/728.3 |
| 5,344,183 A | | 9/1994 | Hersman et al. | |
| 5,431,434 A | * | 7/1995 | Yamakawa | B29C 37/005 280/728.1 |
| 5,611,564 A | * | 3/1997 | Bauer | B29C 59/007 280/728.3 |
| 5,639,115 A | * | 6/1997 | Kelley | B60R 21/2165 280/728.3 |
| 5,913,534 A | * | 6/1999 | Klingauf | B60R 21/21656 280/728.3 |
| 6,613,415 B2 | * | 9/2003 | Iida | B29C 65/08 428/139 |

(Continued)

FOREIGN PATENT DOCUMENTS

KR 20160054876 A 5/2016

*Primary Examiner* — Ruth Ilan
*Assistant Examiner* — Hilary L Johns
(74) *Attorney, Agent, or Firm* — Reising Ethington P.C.

(57) ABSTRACT

A vehicle interior panel and method of manufacturing a vehicle interior panel for use over an airbag. The vehicle interior panel includes a substrate having an airbag door with one or more t-shaped stiffening ribs embedded in the airbag door. The t-shaped stiffening ribs help increase the rigidity of the airbag door, which can help improve deployment performance of the airbag. The t-shaped stiffening ribs may be co-molded or insert molded with the substrate.

13 Claims, 1 Drawing Sheet

(56) References Cited

U.S. PATENT DOCUMENTS

| | | | |
|---|---|---|---|
| 6,726,239 B1 * | 4/2004 | Teranishi | B60R 21/2165 280/728.3 |
| 6,789,816 B2 | 9/2004 | Mar et al. | |
| 7,007,970 B2 * | 3/2006 | Yasuda | B29C 65/06 280/728.3 |
| 7,238,407 B2 * | 7/2007 | Wesch | B32B 5/26 428/138 |
| 7,390,013 B2 * | 6/2008 | Chavez | B60R 21/21656 280/728.3 |
| 7,837,911 B2 * | 11/2010 | Bristow | B29C 51/004 264/321 |
| 7,980,587 B2 | 7/2011 | Chen et al. | |
| 8,424,904 B2 * | 4/2013 | Cech | B60R 11/0247 280/728.3 |
| 8,459,713 B2 * | 6/2013 | Sella | B60R 21/215 280/728.3 |
| 8,657,328 B2 * | 2/2014 | Ory | B60R 21/216 280/728.3 |
| 8,870,219 B1 * | 10/2014 | Roy | B60R 21/205 280/728.3 |
| 8,888,125 B2 * | 11/2014 | Ory | B60R 21/215 280/728.3 |
| 9,010,799 B2 | 4/2015 | Hagl | |
| 9,022,419 B2 * | 5/2015 | Pauthier | B60R 21/205 280/728.3 |
| 9,205,796 B2 * | 12/2015 | Nonoyama | B60R 21/215 |
| 9,573,545 B1 | 2/2017 | Kong | |
| 10,272,600 B2 * | 4/2019 | Speckbacher | B29D 99/0021 |
| 2002/0005630 A1 * | 1/2002 | Suzuki | B60R 21/2165 280/728.3 |
| 2003/0067145 A1 * | 4/2003 | Yasuda | B60R 21/216 280/728.3 |
| 2004/0164524 A1 * | 8/2004 | Ono | B60R 21/2165 280/728.3 |
| 2004/0164525 A1 * | 8/2004 | Gray | B60R 21/216 280/728.3 |
| 2005/0184488 A1 * | 8/2005 | Yasuda | B60R 21/2165 280/728.3 |
| 2007/0108741 A1 * | 5/2007 | Yasuda | B29C 66/73115 280/728.3 |
| 2009/0066068 A1 * | 3/2009 | Kanno | B60R 21/205 280/741 |
| 2013/0026292 A1 * | 1/2013 | Dubost | B64C 1/12 244/117 R |
| 2014/0217708 A1 | 8/2014 | Pickett et al. | |
| 2018/0304846 A1 * | 10/2018 | D'Souza | B60R 21/205 |
| 2020/0062208 A1 * | 2/2020 | Hatfield | B60R 21/215 |

* cited by examiner

AIRBAG DOOR FOR A VEHICLE INTERIOR PANEL AND METHOD OF MANUFACTURING THE SAME

TECHNICAL FIELD

The present disclosure relates generally to vehicle interior panels containing airbag doors and to methods of manufacturing the panels.

BACKGROUND

Airbags may be concealed behind or beneath an interior panel during normal vehicle operation until needed. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to at least partly define the location of the opening, corresponding to an airbag door. The airbag door may open toward the vehicle interior during airbag deployment while remaining attached to the panel by a hinge, tether, or other means so that it is not projected into the vehicle cabin. Controlled deployment of the airbag doors is desirable.

KR 20160054876 to An discloses an airbag door having a dual injection molded reinforced portion, and US 2013/0249195 to Hagl describes reinforcing an airbag door with a scrim material hinge reinforcement. These references describe larger or more complex molded in features, which may complicate manufacturing.

SUMMARY

In accordance with one embodiment, there is provided a vehicle interior panel for use over an airbag, comprising: a substrate having an airbag door; and a t-shaped stiffening rib, wherein the t-shaped stiffening rib is at least partially embedded in the airbag door of the substrate.

In some embodiments, the t-shaped stiffening rib includes a main body portion having an end surface, and a cross portion that intersects with the main body portion.

In some embodiments, the t-shaped stiffening rib has a height defined between the end surface and an impact facing surface, wherein the height of the t-shaped stiffening rib is 70-90%, inclusive, of a thickness of the airbag door.

In some embodiments, the end surface of the main body portion is coincident with an outboard surface of the airbag door.

In some embodiments, the cross portion includes two extension flanges that are oriented generally orthogonally with respect to the main body portion.

In some embodiments, the cross portion includes an impact facing surface formed by both extension flanges.

In some embodiments, the impact facing surface is oriented generally parallel to an inboard side of the airbag door.

In some embodiments, the t-shaped stiffening rib is wholly embedded within a thickness of the airbag door.

In some embodiments, the t-shaped stiffening rib has a primary length between a first side end and a second side end, wherein the primary length is oriented generally parallel to a hinge portion of the airbag door.

In some embodiments, there are a plurality of t-shaped stiffening ribs.

In some embodiments, there is a second airbag door in the substrate and a deployment opening location that is situated at least partially between the airbag door and the second airbag door, wherein a distribution of the plurality of t-shaped stiffening ribs is symmetrical with respect to a portion of the deployment opening location that is situated between the airbag door and the second airbag door.

In accordance with another embodiment, there is provided a method of manufacturing a vehicle interior panel for use over an airbag, the vehicle interior panel including a substrate having an airbag door, the method comprising the steps of: injecting a first plastic material around a t-shaped stiffening rib; and at least partially embedding the t-shaped stiffening rib into the airbag door of the substrate.

In some embodiments, the t-shaped stiffening rib is made from a second plastic material, wherein the second plastic material is more rigid than the first plastic material.

In some embodiments, at least some bonding occurs between the airbag door of the substrate and the t-shaped stiffening rib during the injecting step.

In some embodiments, the t-shaped stiffening rib includes a main body portion having an end surface, and a cross portion that intersects with the main body portion, wherein the end surface is not embedded in the airbag door of the substrate and the cross portion is wholly embedded in the airbag door of the substrate.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described herein is a vehicle interior panel comprising a substrate having an airbag door. The airbag door includes t-shaped stiffening ribs that are co-molded such that they are at least partially embedded within the airbag door. The t-shaped stiffening ribs can be manufactured from a more rigid plastic material than the remainder of the substrate and airbag door. Unlike metal reinforcements or features added to the inside or outside of the airbag door, the airbag door described herein can be more lightweight—a goal in the automotive industry. The t-shaped stiffening ribs increase the stiffness of the airbag doors and can help facilitate better door opening during airbag deployment.

Figure 1:
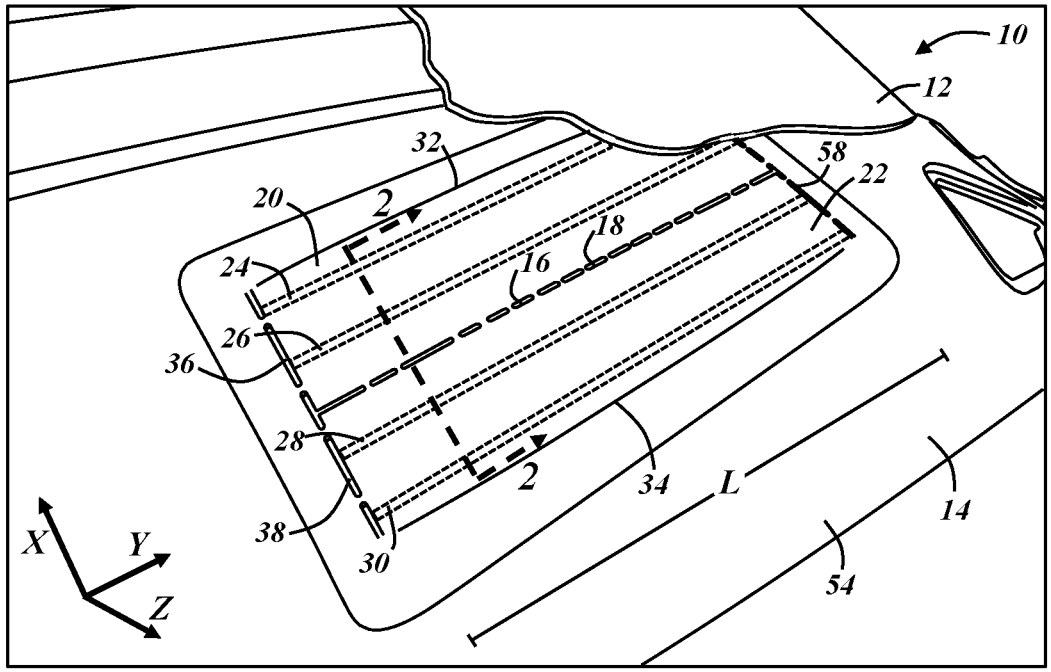
FIG. 1 is a cutaway perspective view of an instrument panel with a pair of airbag doors, according to one embodiment.

FIG. 1 illustrates one embodiment of a vehicle interior panel for use over an airbag. The illustrated panel 10 is an instrument panel, and the passenger side of the panel is shown in a cutaway view. The panel 10 includes a decorative covering 12 overlying a substrate 14. The panel 10 is configured to facilitate airbag deployment therethrough from an underlying airbag module. A predetermined tear seam location 16 is at least partly defined by a plurality of openings 18 formed through the substrate 14. In this case, the tear seam location 16 is arranged in an h-shape so that, when the airbag deploys, the substrate 14 is ruptured along location 16, and two airbag doors 20, 22 open toward the vehicle interior (out of the page in the z-direction). The impact force of the airbag against the airbag doors 20, 22 can sometimes cause buckling of one or more of the doors in the x-direction. Embedded t-shaped stiffening ribs 24, 26, 28, 30, which are described in detail further below, can help prevent bending about the x-axis during airbag deployment. One or more stiffening ribs can be used in a variety of airbag door configurations, and the present disclosure is not limited to the h-shape illustrated in FIG. 1. For example, other tear seam configurations and door structures are certainly possible, such as u-shaped, bow-tie shaped, k-shaped, one or more doors with a continuous opening instead of a segmented tear seam, etc.

Each airbag door 20, 22 pivots about a respective hinge 32, 34 during airbag deployment. The deployment opening in the illustrated embodiment is generally defined by the tear seam 16 and hinges 32, 34. In this embodiment, the airbag doors and hinges are integral parts of the substrate 14, meaning that they are manufactured together as a single component with the surrounding substrate. For simplicity, the hinges 32, 34 are depicted in FIG. 1 as lines that represent illustrative hinge locations. Actual hinge shapes and configurations may vary, and they may include concave portions, convex portions, notched or grooved portions, perforations, or other features designed to facilitate airbag door pivoting.

Each airbag door 20, 22 includes a respective boundary 36, 38 defined by the respective hinge 32, 34 and a portion of the tear seam location 16. For example, the boundary 36 of the upper airbag door 20 is defined by upper hinge 32 and the upper legs and cross-bar of the h-shaped tear seam location 16, while the boundary 38 of the lower airbag door 22 is defined by the lower hinge 34 and the lower legs and cross-bar of the h-shape. The airbag deployment opening that forms through panel 10 shares some of these boundaries. Other panel configurations are possible, including panels for use with steering wheel airbag systems, side-impact airbag systems, or others. In one embodiment, the substrate does not include a tear seam location and instead includes a through-slot along the entire airbag door boundary other than the hinge portion of the boundary. In another embodiment, a groove or other type of stress-concentrator is included on the underside of the substrate opposite the covering at the tear seam location, and the substrate may or may not include openings 18. Other variations will become apparent to skilled artisans, including substrates having different airbag door shapes as discussed above, the inclusion of stress concentrators in covering 12 for tear seam formation, non-integral airbag door hinges, hingeless airbag doors, etc.

Figure 2:
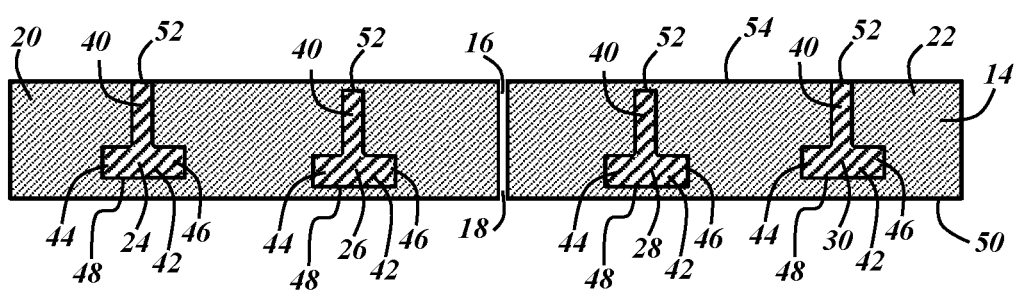
FIG. 2 is a cross-section view of the airbag doors, taken along line 2-2 in FIG. 1.

Panel 10 also includes one or more t-shaped stiffening ribs 24-30, as schematically represented in dotted lines in FIG. 1 to show their location in the panel, and illustrated in cross-section in FIG. 2. The t-shaped stiffening ribs 24-30 are molded together with the substrate 14 of FIG. 1 so that they are at least partially embedded in the plastic material of the substrate. As used here, the term "embedded" refers to material that is encapsulated on multiple sides by another material or material that is recessed into and thereby attached to another material. Advantageously, the t-shaped stiffening ribs 24-30 are co-molded or insert molded with the panel 10, by inserting the t-shaped stiffening ribs into the mold during manufacture of the substrate 14. It should be noted that various features of the panel 10, including the ribs 24-30 are not necessarily to scale, and that dimensional and configurational variations from what is illustrated in FIGS. 1 and 2 are certainly possible.

With reference to FIG. 2, each t-shaped stiffening rib 24-30 includes a main body portion 40 and a cross portion 42 that intersects with the main body portion. The cross portion 42 includes two extension flanges 44, 46 that advantageously are oriented generally orthogonally with respect to the main body portion 40. As used herein, "generally orthogonally" or "generally parallel" represent completely orthogonal or completely parallel, respectively, plus or minus 0-10°. The intersection between the main body portion 40 and the cross portion 42 that forms the t-shape can provide more structural rigidity than other shapes or configurations. In some embodiments, the orientation of the cross portion 42 with respect to the main body portion 40 may vary. For example, if an airbag door has a sloped configuration, the angle of the cross portion with respect to the main body portion may mimic the slope of the door. This results in an impact facing surface 48 of each rib 24-30 that is oriented generally parallel to an inboard side 50 of the substrate 14 and corresponding airbag door 20, 22. This orientation can provide improved bending resistance.

Opposite from each impact facing surface 48 is an end surface 52 located at the end of the main body portion 40. Each t-shaped stiffening rib 24-30 has the impact facing surface 48 oriented toward the inboard side 50 of the substrate 14, and the end surface 52 oriented toward an outboard side 54 of the substrate 14 and the airbag doors 20, 22. The terms "inboard" and "outboard" are generally used to orient various components of the panel 10 closer toward the interior passenger cabin (i.e., "inboard") or facing away from the interior passenger cabin (i.e., "outboard"). Accordingly, "outboard" faces toward the undeployed airbag. The illustrated orientation, with the impact facing surface 48 being formed by and through the two extension flanges 44, 46, and oriented closer to the inboard side 50 than any other portions of the rib, can help increase the bending resistance in the x-direction.

As shown in FIG. 2, the extent of embeddedness for each of the t-shaped stiffening ribs 24-30 may vary. FIG. 2 is meant to illustrate a wholly embedded embodiment, where the ribs 26, 28 have their respective end surfaces 52 located entirely within a thickness T of the substrate 14. The ribs 24, 30, on the other hand, have end surfaces 52 which are coincident with the inboard side 50 of the substrate 14. Typically, the extent of embeddedness will be the same for all of the ribs 24-30, but FIG. 2 schematically illustrates two different embodiments. The ribs 24, 30 generally have an end surface 52 that is not embedded (some plastic material may slightly cover the end surface 52 as a result of manufacturing, but in the non-embedded embodiment, the end surface 52 is situated directly adjacent the mold during manufacture). All of the ribs 24-30, however, advantageously have a cross portion 42 and an impact facing surface 48 which is wholly embedded within the thickness T of the substrate 14 and the airbag doors 20, 22. Having the cross portion 42 and the impact facing surface 48 wholly embedded can result in better material flow during the injection molding process, and also provides a smooth and generally unobstructed outboard side 54, which can improve deployment performance. Having the end surface 52 coincident with the inboard side can provide for easier manufacturing, as this portion of the t-shaped stiffening ribs 24, 30 can rest against the mold during injection of the substrate 14.

Returning to FIG. 1, each t-shaped stiffening rib 24-30 extends longitudinally across each airbag door 20, 22. The length L of each t-shaped stiffening rib 24-30 may extend between the legs of the tear seam 16, as shown. More particularly, each t-shaped stiffening rib 24-30 extends from a first side end 56 and a second side end 58, with the side ends coinciding with the legs of the tear seam 16. In other embodiments, the length one or more of the ribs may be longer than the legs of the tear seam, and then the tear seam is formed by cutting the openings 18 through the t-shaped stiffening ribs. In yet other embodiments, the length of one or more of the ribs may be shorter than the distance L shown in FIG. 1. Additionally, in this embodiment, the length L of each rib 24-30 is oriented generally parallel to the hinge portions 32, 34 of the respective airbag door 20, 22.

The size and number of t-shaped stiffening ribs 24-30 may vary from what is illustrated in the figures. In an advantageous embodiment, the height H of each stiffening rib (represented in FIG. 2 as the height H of the rib 24) is about 70-90% of the thickness T. Even more preferable, the height H is about 80% of the thickness T. Additionally, there may be less t-shaped stiffening ribs (e.g., one per door 20, 22) or more than what is illustrated. For example, a U-shaped door could include five or six t-shaped stiffening ribs. The number of t-shaped stiffening ribs will likely depend on the desired deployment performance and the size of the airbag door. Advantageously, the t-shaped stiffening ribs 24-30 are symmetrically distributed with respect to the portion of the tear seam or deployment opening 16 that is located between the two airbag doors 20, 22.

The t-shaped stiffening ribs 24-30 are preferably manufactured from a molded or extruded plastic material that is stiffer and/or more rigid than the material for the body of the substrate 14. In some implementations, the t-shaped stiffening ribs 24-30 are made from a rigid polypropylene or acrylonitrile butadiene styrene (ABS). The formed t-shaped stiffening ribs 24-30 can be placed in a mold prior to injection of a plastic material that is used for the substrate 14. In one implementation, the plastic material for the substrate 14 (at least the airbag door portions 20, 22) is a thermoplastic elastomer (TPE). The combination of the flexible plastic material for the body of the substrate 14 and the more rigid plastic material for the ribs 24-30 can provide internal stiffness in the vehicle interior panel while optimizing deployment performance. Moreover, with both the substrate 14 and the t-shaped stiffening ribs 24-30 being made from plastic materials, some bonding between the substrate and the ribs may occur during the injection molding of the substrate around the ribs. Further, the plastic materials for the ribs 24-30 and substrate 14, respectively, may be more lightweight and cost-effective than other material choices, which is advantageous. Additionally, since the t-shaped stiffening ribs 24-30 are embedded into the substrate 14 during manufacture, the airbag doors 20, 22 may have projection-free inboard and outboard sides 50, 54, which can improve deployment performance.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel for use over an airbag, comprising:
   a substrate having an airbag door; and
   a plurality of t-shaped stiffening ribs, each t-shaped stiffening rib of the plurality of t-shaped stiffening ribs having a cross portion and a main body portion, and wherein each t-shaped stiffening rib is spaced from and separately embedded in the airbag door of the substrate with respect to one or more other t-shaped stiffening ribs of the plurality of t-shaped stiffening ribs.

2. A vehicle interior panel for use over an airbag, comprising:
   a substrate having an airbag door; and
   a t-shaped stiffening rib, wherein the t-shaped stiffening rib is at least partially embedded in the airbag door of the substrate, and wherein the t-shaped stiffening rib has a height defined between the end surface and an impact facing surface, wherein the height of the t-shaped stiffening rib is 70-90%, inclusive, of a thickness of the airbag door.

3. The vehicle interior panel of claim 1, wherein an end surface of each main body portion is coincident with an outboard surface of the airbag door.

4. The vehicle interior panel of claim 1, wherein each cross portion includes two extension flanges that are oriented generally orthogonally with respect to the main body portion.

5. The vehicle interior panel of claim 4, wherein each cross portion includes an impact facing surface formed by both extension flanges.

6. The vehicle interior panel of claim 5, wherein each impact facing surface is oriented generally parallel to an inboard side of the airbag door.

7. The vehicle interior panel of claim 1, wherein each t-shaped stiffening rib of the plurality of t-shaped stiffening ribs is wholly embedded within a thickness of the airbag door.

8. The vehicle interior panel of claim 1, wherein each t-shaped stiffening rib of the plurality of t-shaped stiffening ribs has a primary length between a first side end and a second side end, wherein each primary length is oriented generally parallel to a hinge portion of the airbag door.

9. The vehicle interior panel of claim 1, further comprising a second airbag door in the substrate and a deployment opening location that is situated at least partially between the airbag door and the second airbag door, wherein a distribution of the plurality of t-shaped stiffening ribs is symmetrical with respect to a portion of the deployment opening location that is situated between the airbag door and the second airbag door.

10. A method of manufacturing a vehicle interior panel for use over an airbag, the vehicle interior panel including a substrate having an airbag door, the method comprising the steps of:

injecting a first plastic material around a t-shaped stiffening rib made from a second plastic material, wherein the first plastic material is a thermoplastic elastomer and the second plastic material is polypropylene or acrylonitrile butadiene styrene (ABS); and at least partially embedding the t-shaped stiffening rib into the airbag door of the substrate.

11. The method of claim 10, wherein at least some bonding occurs between the airbag door of the substrate and the t-shaped stiffening rib during the injecting step.

12. The method of claim 10, wherein the t-shaped stiffening rib includes a main body portion having an end surface, and a cross portion that intersects with the main body portion, wherein the end surface is not embedded in the airbag door of the substrate and the cross portion is wholly embedded in the airbag door of the substrate.

13. The method of claim 10, wherein the injecting step includes injecting the first plastic material around a plurality of t-shaped stiffening ribs, each t-shaped stiffening rib of the plurality of t-shaped stiffening ribs having a cross portion and a main body portion, and wherein each t-shaped stiffening rib is spaced from and separately embedded in the airbag door of the substrate with respect to one or more other t-shaped stiffening ribs of the plurality of t-shaped stiffening ribs.

* * * * *